US008676050B2

(12) United States Patent
Shuster

(10) Patent No.: US 8,676,050 B2
(45) Date of Patent: Mar. 18, 2014

(54) AUTOFOCUS CALIBRATION FOR LONG LENSES

(76) Inventor: Gary S. Shuster, Fresno, CA (US)

( * ) Notice: Subject to any disclaimer, the term of this patent is extended or adjusted under 35 U.S.C. 154(b) by 208 days.

(21) Appl. No.: 13/340,579

(22) Filed: Dec. 29, 2011

(65) Prior Publication Data

US 2012/0170922 A1 Jul. 5, 2012

Related U.S. Application Data

(60) Provisional application No. 61/428,015, filed on Dec. 29, 2010.

(51) Int. Cl.
*G03B 13/18* (2006.01)
(52) U.S. Cl.
USPC ............. 396/89; 356/4.05; 356/125; 348/187
(58) Field of Classification Search
CPC ............... G03B 17/56; G03B 2217/00; G03B 2217/002; G03B 17/00; G03B 17/568
USPC .......................................................... 396/125
See application file for complete search history.

(56) References Cited

U.S. PATENT DOCUMENTS

| 2,340,434 | A | | 2/1944 | Spencer |
| 3,887,289 | A | * | 6/1975 | Smart ............................ 403/315 |
| 4,032,934 | A | | 6/1977 | Hendrickson et al. |
| 4,104,650 | A | | 8/1978 | Hosoe et al. |
| 4,299,460 | A | | 11/1981 | Hasegawa |
| 4,320,947 | A | | 3/1982 | Komine |
| 4,557,599 | A | | 12/1985 | Zimring |
| 4,601,557 | A | | 7/1986 | Bogle et al. |
| 5,092,670 | A | | 3/1992 | Preston |
| 5,498,864 | A | | 3/1996 | Osawa |
| 5,664,235 | A | | 9/1997 | Ohmura et al. |
| 5,760,829 | A | * | 6/1998 | Sussmeier ..................... 348/187 |
| 7,048,390 | B2 | | 5/2006 | Kitabayashi |

FOREIGN PATENT DOCUMENTS

| JP | 2000184343 A | * | 6/2000 | ............... H04N 7/14 |
| JP | 2008003144 A | * | 1/2008 | |

OTHER PUBLICATIONS

Translation of JP Publication No. 2008-003144; Title: Lens Adjustment System; Inventor: Sasaki, Tadashi; Publication Date: Jan. 10, 2008.*
Translation of JP Publication No. 2000-184343; Title: Network Adaptor; Inventor: Fukui, Toshiyuki; Publication Date: Jun. 20, 2000.*

(Continued)

*Primary Examiner* — W B Perkey
*Assistant Examiner* — Fang-Chi Chang
(74) *Attorney, Agent, or Firm* — Novak Druce Connolly Bove + Quigg LLP; Jonathan Jaech

(57) ABSTRACT

A method for calibrating a focus point for a camera lens may include capturing a reflection of a focus point measuring device that is affixed to the camera. The method may include evaluating a captured image of the reflection to measure a calibration amount for a focus point, and adjusting a focus point of a lens of the camera by the calibration amount. The focus point measuring device may include a substantially planar target surface defining a plane, and a ruled target surface inclined at substantially 45° to the substantially planar target and extending through the plane thereof, marked to indicate respective distances in front of and behind the plane. The device may further include a fixture for holding the substantially planar target surface and the ruled target surface in a defined orientation to the camera, enabling performance of the method.

19 Claims, 2 Drawing Sheets

(56) References Cited

OTHER PUBLICATIONS

How LensAlign Works. http://michaeltapesdesign.com/lensaligh.html; pp. 1-2.

LensAlign—AutoFocus Micro Adjustment. http:/www.whibalhost.com/lensalign-works.html, p. 1.

LensAlign Focus Calibration System. http:/www.whibalhost.com/lensalign/products.html. p. 1.

LensAlign Focus Calibration System. http://www.whibalhost.com/lensalign/whatislensalign.http. p. 1.

\* cited by examiner

AUTOFOCUS CALIBRATION FOR LONG LENSES

CROSS-REFERENCE TO RELATED APPLICATION

This application claims priority pursuant to 35 U.S.C. §119 (e) to U.S. provisional application Ser. No. 61/428,015, filed Dec. 29, 2010, which is hereby incorporated by reference, in its entirety.

BACKGROUND

1. Field

This application relates to methods and systems for calibrating a focus point for a camera lens.

2. Description of Related Art

High-end cameras and lenses are often susceptible to back-focusing or front focusing problems, which may be described as automatically focusing on a point that is slightly behind or in front of the point that the photographer intends to focus on, usually the surface of some object. These problems arise from manufacturing tolerances used in mass-production of camera lenses, coupled with the fact that, particularly for long lenses, any imprecision in the manufacture of the lens or its auto focus system may show up as a noticeable lack of focus, especially when automatically focusing on a distant object. Imprecision can also build up in unpredictable ways from coupling a lens to other elements in the optical path, such as a camera body.

To compensate for unavoidable imprecision in manufacturing, many camera manufacturers build cameras equipped with Micro-AF adjustment capability. Such capability enables the user to instruct the camera to automatically apply a degree of plus or minus focus correction in response to being coupled to a defined lens. It remains up to the user to determine an amount of focus correction, sometimes called a calibration amount, that should be applied for each particular camera and lens combination.

Various methods may be used to determine an amount of focus correction for a particular camera/lens combination. For example, "LensAlign"™, available from www.whibalhost.com, is a device that may be used to measure an amount of back focus or front focus, and thereby determine an amount of focus correction to apply. A LensAlign device is comprised of a base for holding the camera which can sit flat on a table, or be mounted on a light stand or tripod, together with a front standard and a rear standard. The front standard provides a focus target and is marked with precision rulings similar to a measurement ruler or the like. The rear standard is marked with several bulls-eye targets that line up with holes on the front standard, for aligning the camera with the front standard so that the camera and focus target are exactly plane parallel. Alignment is performed by sighting through the camera and lens until the bulls-eye targets are exactly aligned with holes in the front standard, then using the camera's autofocus to focus on the front standard, capturing an image and evaluating the image. Because of the precision rule markings on the front standard, the amount of front or back focus is readily visible from the captured image. Further details are shown at http://www.whibalhost.com/lensalign/how-lensalign-works.html.

SUMMARY

Methods and systems for calibrating a focus point for a camera lens are disclosed, including methods and systems using a fixture and alignment device attached to a camera.

In an aspect, a method for calibrating a focus point for a camera lens may include, using a camera, capturing a reflection of a focus point measuring device, wherein the focus point measuring device is affixed to the camera. The method may further include evaluating a captured image of the reflection to measure a calibration amount for a focus point. The method may further include adjusting a focus point of a lens of the camera by the calibration amount. The method may include selecting the focus point measuring device to be in a particular form, as described in more detail herein.

In related aspects, the method may include fastening the fixture to the camera using a removable fastener. For example, the method may include interposing the fixture between a tripod and the camera for mounting the camera to the tripod, and attaching the tripod to the fixture. In the alternative, the method may include attaching the fixture to a hot shoe for the camera. In another alternative, the method may include attaching the fixture to the lens.

In other aspects, the method may include holding the substantially planar target surface so that a plane thereof is perpendicular to a reflected leg of a line of sight between the mirror and a substantially planar target. In the alternative, or in addition, the method may include holding the substantially planar target surface so that a non-reflected leg of the line of sight between the lens and the mirror is not parallel to the second portion of the line of sight.

In an aspect of the method, or separately from practice of the method, the focus point measuring device may be provided in a particular form. In an aspect, the focus point measuring device may be provided as an apparatus including a substantially planar target surface defining a plane, and a ruled target surface inclined at substantially 45° to the substantially planar target and extending through the plane thereof, marked to indicate respective distances in front of and behind the plane. The apparatus may further include a fixture for holding the substantially planar target surface and the ruled target surface in a defined orientation to a camera, whereby a reflection of the substantially planar target surface and the ruled target surface is made visible through the camera and its lens pointing at a mirror along a line of sight, in which reflection the substantially planar target surface and the ruled target surface are centrally disposed in a field of view along the line of sight and the substantially planar target surface is substantially perpendicular to the line of sight.

In related aspects, the apparatus may further include a removable fastener for fastening the fixture to the camera. The fixture may be configured to mount to the camera in various different ways. In an aspect, the fixture may be configured to mount interposed between a tripod and the camera, for mounting the camera to the tripod. In such configurations, the apparatus may further include the tripod attached to the fixture. In an alternative aspect, the fixture may be configured to attach to a hot shoe for the camera, for example by including a male mounting piece shaped to insert in a hot show female mounting bracket. In another alternative, the fixture may be configured to attach to the lens, for example using a circular (e.g., annular) clamp.

In another aspect, the fixture may be configured to hold the substantially planar target surface so that the plane thereof is perpendicular to a reflected leg of the line of sight between the mirror and the substantially planar target. For example, the fixture may be attached to the substantially planar target surface and include a camera mounting interface that is oriented to align the target surface within a few degrees of perpendicular to the camera line of sight. The degree of inclination may be fixed or adjustable.

In another aspect, the fixture may be configured to hold the substantially planar target surface so that a non-reflected leg of the line of sight between the lens and the mirror is not parallel to the second portion (i.e., the reflected leg) of the line of sight. For example, the fixture may be attached to the substantially planar target surface and include a camera mounting interface that is oriented to align the target surface at a non-zero inclination of perpendicular to the camera line of sight; for example, between 5 and 10 degrees.

In another aspect, the substantially planar target surface defining a plane and the ruled target surface are formed in a molded polymer material. In addition, may formed in a molded polymer material, either as a separate piece or molded in the same piece as the substantially planar target surface and the ruled target surface.

Further embodiments, aspects and details of the method and apparatus for calibrating a focus point for a camera lens are presented in the detailed description that follows.

BRIEF DESCRIPTION OF THE DRAWINGS

The present technology, in accordance with one or more various embodiments, is described in detail with reference to the following figures. The drawings are provided for purposes of illustration only and merely depict illustrative examples.

DETAILED DESCRIPTION

Figure 1:
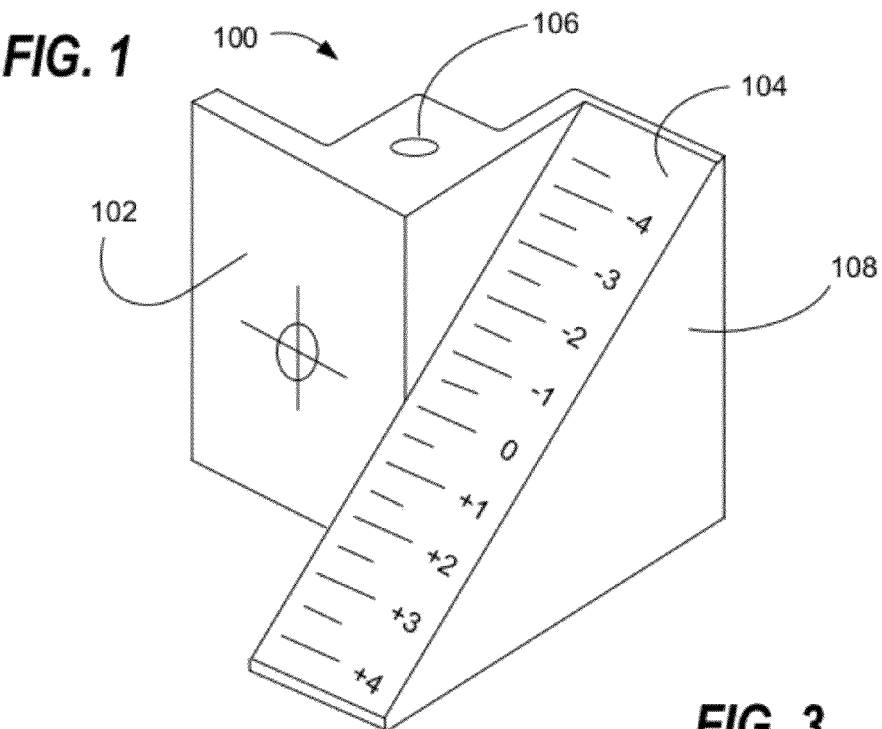
FIG. 1 is an isometric view of a focus point measuring device illustrating aspects of the present technology.

Notwithstanding the advantages of LensAlign or similar devices and methods, they may be subject to certain disadvantages. One disadvantage may relate to the amount of distance required to set up the measuring device and capture an image. For example, using a multiplier of 50 times the focal length as recommended by one prominent lens manufacture, a lens with a focal length of 400 mm requires a 20 meter calibration distance. Many photographers may not have convenient access to a suitable calibration space at least 20 meters long. In addition, the process of aligning the calibration device to the camera may be unnecessarily time consuming or may unnecessarily introduce a possibility for error.

The present disclosure describes a method and apparatus that overcomes these and other limitations of the prior art, by providing a precision-ruled focus target in a fixture attached to the camera body. For example, the camera may be mounted on a focus target which in turn mounts on a tripod. In the alternative, the tripod may be provided with the focus target built into it or attached below, beside, or above the camera mount. In another alternative, the focus target mounts on the hot-shoe of the camera. A less preferred alternative is for the focus target to be mounted on the lens itself, such as in the threads. This may introduce the disadvantage of having to use a focus point other than the center point, as the center point would be the lens itself.

To use the alignment fixture, the camera is pointed at a flat mirror which reflects the focus target. The user focuses on the reflection of the target appearing in the mirror, and captures an image of the reflection. This effectively doubles the distance to the focus target, without having to find additional linear space. For example, a 400 mm long lens can be effectively calibrated in a distance of 10 m, using the fixture with a mirror, instead of the 20 m that would be required using a prior art calibration method. In addition, there is no need to manually align the focus target to the camera, because the fixture is configured to hold the focus target in a defined alignment with the focal plane of the lens. When the camera is in the center of the frame as seen in the reflection, the focus target is necessarily flat relative to the focal plane of the camera. Once having captured an image of the focus target, the user may determine the calibration amount in a conventional manner, by examining the image of the focus target to see where on the ruled target the point of focus actually lies.

In a one implementation, the mirror is angled very slightly up, and the target is angled very slightly down so that the camera is able to center on the focal target as flat relative to the focal plane of the camera. This angling may be used to compensate for the fact that an opaque focus target cannot be placed directly in front of the camera lens without obstructing the field of view. Instead of "angling up" and "angling down," in any other similar complimentary configuration may be used. In the alternative, the focus target may transmit light in one direction but not another, as a one-way mirror.

Referring to FIG. 1, an example of an apparatus 100 for measuring a focus calibration amount is shown in perspective view. The example is simplified to illustrate general aspects of a suitable measurement apparatus, and should not be understood as representing a detailed design for such an apparatus with respect to aspects that are not discussed. The apparatus 100 may comprise a substantially planar and opaque target surface 102 defining a focus plane. The target surface may be marked or imprinted with one or more markings to aid in centering and focusing thereon using a camera's autofocus mechanism. The target surface should be large enough in area and configured with surface properties to reliably reflect the camera's sounding signal, for example an infrared pulse.

As used herein, "substantially planar" means planar within reasonable manufacturing tolerances, so that the surface is apparently planar so far as is perceptible using the focusing optics of the camera lens. The term "planar" means in the form of a plane; this may include but is not strictly limited to a flat surface target 102 as depicted in FIG. 1. One purpose of the substantially planar target surface is to provide an object that can be brought into sharp focus by aligning a focus plane of the camera lens as closely as possible with the target. Therefore, if the focal plane of the camera lens is not substantially flat (i.e., it is curved in some detectable amount), then the target surface may be curved to parallel and curvature in the lens' focal plane. Another purpose for the target surface 102 may be to reflect the camera's sounding signal for autofocus back to the camera. For example, a flat or slightly parabolic target surface may facilitate this purpose.

The apparatus 100 may further comprise a ruled target surface 104 inclined at substantially 45° (for example, 45°±5°) to the substantially planar target 102 and extending through the plane thereof. The relative position and orientation of the planar surface 102 and ruled surface 104 should be fixed by configuration of the supporting fixture 108.

The ruled surface 104 is marked to indicate respective distances in front of and behind the plane of the planar surface 102. For example, the ruled surface may be marked zero at the point of intersection with the planar surface 102, with positive and negative markings on respective sides of the zero point, as shown. A more detailed example of a ruled marking surface is provided by the LensAlign™ device referenced above, which has staggered rule markings resembling a Vernier scale exhibiting a fine regular pattern for more easily ascertaining the exact focus point. The ruled surface 104 is not intended to reflect the camera's sounding signal for autofocus, and as such may be positioned immediately adjacent to or near the surface 102 so as to appear in photographs taken of the planar surface 102 without interfering with distance sounding by the camera's autofocus mechanism.

The apparatus 100 further comprises a fixture 108 of any suitable structural material configured for holding the substantially planar target surface 102 and the ruled target surface 104 in a defined orientation relative to a camera. For example, a camera body may be attached using a fastener to a receptacle 106 (e.g., a threaded hole), bearing against a mounting surface adjacent to the receptacle 106. The fixture holds the two surfaces 102, 104 at a relative orientation to an attached camera such that a reflection of the substantially planar target surface and the ruled target surface is made visible through the camera and its lens pointing at a flat mirror along a line of sight. In such a reflection, the substantially planar target surface 102 and the ruled target surface 104 are centrally disposed in a field of view along the line of sight and the substantially planar target surface 102 is substantially perpendicular to the line of sight.

Apparatus 100 lacks any feature for optically aligning the planar surface 102 to a camera lens. Such a feature is not necessary, because the fixture 108 includes a mechanical alignment feature, for example one or more mounting surfaces (for example three mounting pads, not shown) to align the camera body and hence its lens with respect to the target surface 102.

Figure 2:
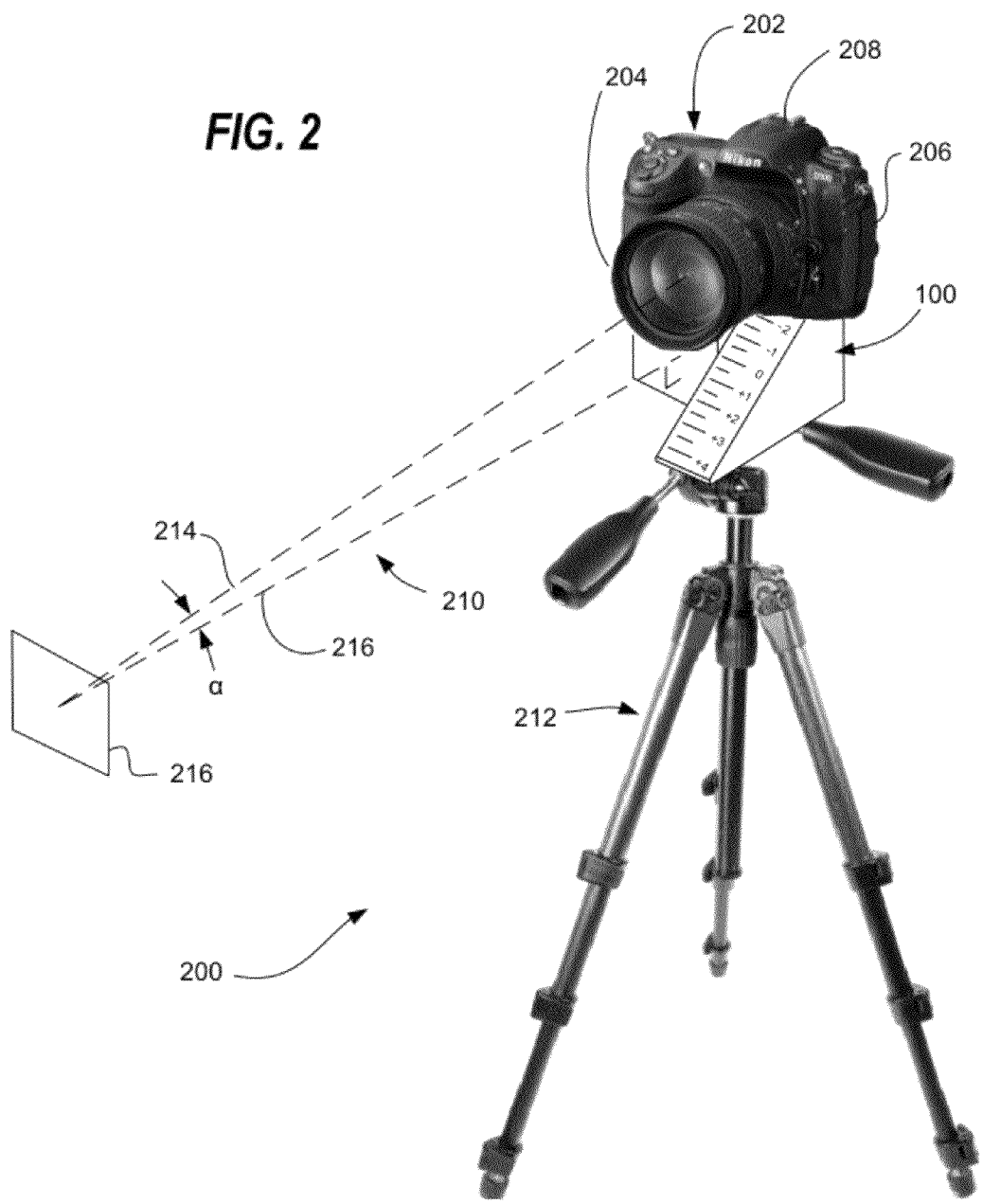
FIG. 2 is a system diagram illustrating aspects of using a focus point measuring device with a camera and other elements to calibrate a focus point for a camera lens.

FIG. 2 shows the apparatus 100 attached to a support structure, for example a tripod 212 and to a camera 202. In the illustrated embodiment, the apparatus 100 is interposed between the camera body 206 and the tripod 212. In the alternative, the apparatus 100 may be fixed above the camera body 206, for example by mounting to the hot shoe 208, with the camera body 206 mounted directly to the tripod 212. Either way, when mounted to the apparatus 100, the camera 202 and its lens 204 are held relative to the apparatus 100 using any suitable mounting attachment at an orientation whereby a reflection of the substantially planar target surface 102 and the ruled target surface 104 is made visible through the camera 202 and its lens 204 pointing at a flat mirror 216 along a line of sight 210. In such a reflection visible in the mirror 216, the substantially planar target surface 102 and the ruled target surface 104 are centrally disposed in a field of view along the line of sight 210 and the substantially planar target surface 102 is substantially perpendicular to the line of sight 210, for example, at an angle of 90°±5°.

Typically the mirror 216 may be attached to or supported by a wall or other support structure (not shown) that is substantially perpendicular to a floor or other support surface. Meanwhile, the base of the tripod 212 may also rest on the same floor or other support surface, and be leveled so that when a camera is attached to the apparatus 100 or directly to the tripod 212, line of sight 210 for the lens 204 is parallel to the floor and thus perpendicular, or nearly perpendicular, to the reflective surface of the mirror 216. Thus, when the lens is pointed at the mirror until the planar surface 102 is in the center of its field of view, the planar surface 102 will be parallel, or nearly parallel, to the reflective surface of the mirror 216. The foregoing example demonstrates how the mechanical system 200 comprising a mirror support (e.g., wall), floor, tripod, and apparatus 100 can be used to quickly align the working surfaces of the apparatus 100 with the central line of sight 210 for the lens 204 and camera body 206, without using an optical alignment device. Other methods of mechanical alignment may also be used, characterized by the disclosed feature of mechanically attaching the apparatus 100 to the camera 202.

In the depicted embodiment, the planar target 102 is slightly off center of the center of the lens 204, which is naturally necessary to avoid obstructing the line of sight 210, at least when the planar surface is constructed of an opaque material. Therefore, the line of sight 210 comprises a first leg 214 between the lens 204 and mirror 216 inclined at an angle "α" to a second leg 216 between the mirror 216 and planar surface 102. The angle α may be fairly small, and may be determined by the arctangent of the perpendicular distance between the center of the planar surface and the first leg 214 line of sight divided by the length of the leg 214 (i.e., one-half the total line of sight 210 length). For example, assuming a 10 cm perpendicular offset of leg 214 from the center of the target 102 and a total line of sight length of 20 m, the angle α equals the arctangent of 0.1 m/10 m, which is approximately 0.57°. The fixture 108 may be configured to hold the camera 202 so that the angle α may be fixed or adjusted as needed for different camera bodies and alignment lengths. For example, once the system 200 is in place the user may turn a fine adjustment screw to pivot the camera 202 slightly up or down (or side to side) until the center target of the planar surface appears in the center of the camera's field of view.

Figure 3:
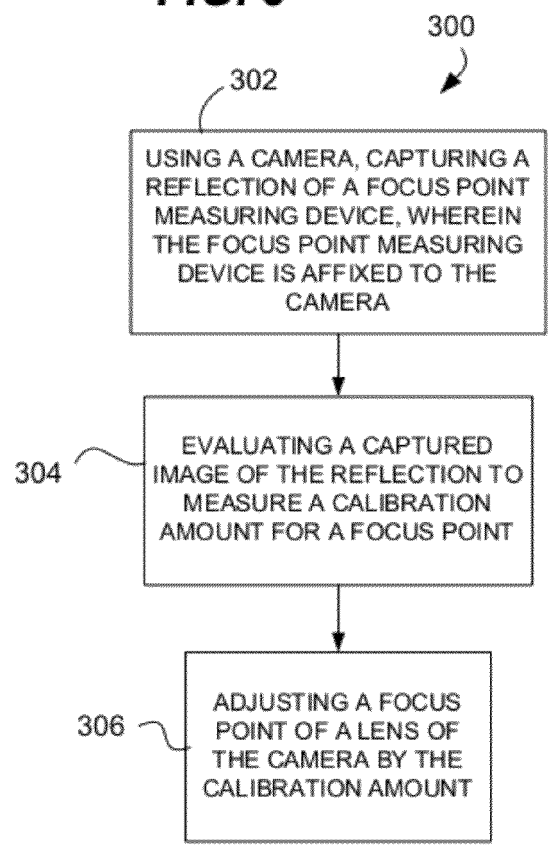
FIG. 3 is a flow chart showing examples of operations in a method for calibrating a focus point for a camera lens.

Consistent with the foregoing, a user may use the focus measurement apparatus 100 or equivalent device to determine an amount of focus adjustment for an autofocus feature of a camera/lens combination, using a method 300 as shown in FIG. 3. Initially, the user configures the apparatus 100 with other elements of a system 200 as shown and described above. Then, using a camera, a user may capture 302 a reflection of the focus point measuring device (e.g., apparatus 100). Then, after taking a photograph of the reflection, the user evaluates 304 a captured image of the reflection to measure a calibration amount for a focus point. The user may then adjust 306 a focus point of a lens of the camera by the calibration amount.

By way of example, a distinguishing feature of this method 300 is that the focus point measuring device is affixed to the camera instead of being a free standing object. Another point of distinction is that a reflection of the measuring apparatus is captured, for example by photographing the device as reflected in a mirror, instead of an unreflected image of the measuring device. Yet another point of distinction is that no optical alignment device is needed for aligning the measurement device to the camera; instead a mechanical fixture that affixes the camera to the measuring device is used to align the two bodies. The appended examples further illustrate features and aspects of the innovative technology disclosed herein.

What is claimed is:

1. A apparatus, comprising:
   a substantially planar target surface defining a plane;
   a ruled target surface inclined at substantially 45° to the substantially planar target and extending through the plane thereof, marked to indicate respective distances in front of and behind the plane; and
   a fixture for holding the substantially planar target surface and the ruled target surface in a defined orientation to a camera, whereby a reflection of the substantially planar target surface and the ruled target surface is made visible through the camera and its lens pointing at a mirror along a line of sight, in which reflection the substantially planar target surface and the ruled target surface are centrally disposed in a field of view along the line of sight and the substantially planar target surface is substantially perpendicular to the line of sight.

2. The apparatus of claim 1, further comprising a removable fastener for fastening the fixture to the camera.

3. The apparatus of claim 1, wherein the fixture is configured to mount interposed between a tripod and the camera, and is configured for mounting the camera to the tripod.

4. The apparatus of claim 3, further comprising the tripod attached to the fixture.

5. The apparatus of claim 1, wherein the fixture is configured to attach to a hot shoe for the camera.

6. The apparatus of claim 1, wherein the fixture is configured to attach to the lens.

7. The apparatus of claim 1, wherein the fixture is configured to hold the substantially planar target surface so that the plane thereof is perpendicular to a reflected leg of the line of sight between the mirror and the substantially planar target.

8. The apparatus of claim 7, wherein the fixture is configured to hold the substantially planar target surface so that a non-reflected leg of the line of sight between the lens and the mirror is not parallel to the second portion of the line of sight.

9. The apparatus of claim 1, wherein the substantially planar target surface defining a plane and the ruled target surface are formed in a molded polymer material.

10. The apparatus of claim 1, wherein the fixture is formed in a molded polymer material.

11. A method comprising:
    using a camera, capturing a reflection of a focus point measuring device, wherein the focus point measuring device is affixed to the camera; and
    evaluating a captured image of the reflection to measure a calibration amount for a focus point, wherein the focus point measuring device comprises:
        a substantially planar target surface defining a plane;
        a ruled target surface inclined at substantially 45° to the substantially planar target and extending through the plane thereof, marked to indicate respective distances in front of and behind the plane; and
        a fixture for holding the substantially planar target surface and the ruled target surface in a defined orientation to the camera, whereby a reflection of the substantially planar target surface and the ruled target surface is made visible through the camera and its lens pointing at a mirror along a line of sight, in which reflection the substantially planar target surface and the ruled target surface are centrally disposed in a field of view along the line of sight and the substantially planar target surface is substantially perpendicular to the line of sight.

12. The method of claim 11, further comprising adjusting a focus point of a lens of the camera by the calibration amount.

13. The method of claim 11, further comprising fastening the fixture to the camera using a removable fastener.

14. The method of claim 11, further comprising interposing the fixture between a tripod and the camera for mounting the camera to the tripod.

15. The method of claim 14, further comprising attaching the tripod to the fixture.

16. The method of claim 11, further comprising attaching the fixture to a hot shoe for the camera.

17. The method of claim 11, further comprising attaching the fixture to the lens.

18. The method of claim 11, further comprising holding the substantially planar target surface so that the plane thereof is perpendicular to a reflected leg of the line of sight between the mirror and the substantially planar target.

19. The method of claim 11, further comprising holding the substantially planar target surface so that a non-reflected leg of the line of sight between the lens and the mirror is not parallel to the second portion of the line of sight.

* * * * *